United States Patent [19]
Hluchyj et al.

[11] Patent Number: 5,524,006
[45] Date of Patent: Jun. 4, 1996

[54] SECOND-ORDER LEAKY BUCKET DEVICE AND METHOD FOR TRAFFIC MANAGEMENT IN CELL RELAY NETWORKS

[75] Inventors: Michael G. Hluchyj, Wellesley; Nanying Yin, Newton Centre, both of Mass.

[73] Assignee: Motorola, Inc., Schaumburg, Ill.

[21] Appl. No.: 389,532

[22] Filed: Feb. 15, 1995

[51] Int. Cl.[6] ............................... H04J 3/14; H04L 12/26
[52] U.S. Cl. ..................... 370/84; 370/85.6; 370/94.2
[58] Field of Search ........................... 370/94.1, 94.2, 370/60, 60.1, 84, 85.6, 17

[56] References Cited

U.S. PATENT DOCUMENTS 5,339,332  8/1994  Kammerl ........................... 370/94.1 X
5,426,640  6/1995  Hluchyj et al. ........................ 370/60 X
5,434,848  7/1995  Chimento, Jr. et al. ........... 370/60.1 X

OTHER PUBLICATIONS

"Input Selective Cell Tagging and Discarding with MMPP Traffic Model for BISDN/ATM Congestion Control", Kazem Sohraby Globecom '93 IEEE, 1993.
"Tagging Versus Strict Rate Enforcement in ATM Networks", A. Gravy, et al. Globecom '91, IEEE Global Telecommunications Conference, 1991.

*Primary Examiner*—Douglas W. Olms
*Assistant Examiner*—Min Jung
*Attorney, Agent, or Firm*—Darleen J. Stockley

[57] ABSTRACT

A traffic management policing device (TMPD) (600) and method (TMPM) (700) monitor and substantially enforce a sustainable cell rate (SCR) and burst tolerance (BT) in a cell relay network utilizing a second-order leaky bucket system in conjunction with a peak cell rate (PCR) leaky bucket, thus substantially providing a predetermined quality of service.

8 Claims, 5 Drawing Sheets

FIG. 7
700

702 — IN A CELL RELAY NETWORK, UTILIZING A PEAK CELL RATE (PCR) LEAKY BUCKET THAT RECEIVES CELLS HAVING AT LEAST AN INFORMATION FIELD AND A HEADER, WHERE THE HEADER INCLUDES A CELL LOSS PRIORITY (CLP) BIT, FOR DISCARDING CELLS IN ACCORDANCE WITH A PREDETERMINED SCHEME

704 — UTILIZING A CELL LOSS PRIORITY (CLP) DETERMINING UNIT THAT IS OPERABLY COUPLED TO THE PCR LEAKY BUCKET FOR DETERMINING WHETHER A CLP BIT IN EACH CELL HEADER IS EQUAL TO ZERO

706 — UTILIZING A SECOND ORDER LEAKY BUCKET SYSTEM (SOLBS) THAT IS OPERABLY COUPLED TO THE CLP DETERMINING UNIT FOR MONITORING AND ENFORCING PREDETERMINED SCR AND BT TRAFFIC PARAMETERS SUCH THAT AN AVERAGE DELAY AND TAG RATE ARE PROVIDED FOR CELLS THAT SUBSTANTIALLY PROVIDE A PREDETERMINED QUALITY OF SERVICE

FIG. 8
800

802 — UTILIZING A SECOND ORDER LEAKY BUCKET THAT IS OPERABLY COUPLED TO THE CLP DETERMINING UNIT TO RECEIVE CELLS IN ACCORDANCE WITH PREDETERMINED NON-CONFORMANCE CRITERIA

804 — USING A CLP SETTING UNIT THAT IS OPERABLY COUPLED TO THE SECOND ORDER LEAKY BUCKET FOR SETTING THE CLP BIT OF NON-CONFORMING CELLS TO ONE

1102 — PRESETTING INITIAL PARAMETERS RHO, RH1, RH2 P1, P2, AMD P,
WHERE RHO1<1, RHO2<1, P1<1, P2<1, AND P1, P2=P,
RHO IS A PRESELECTED VALUE LESS THAN ONE FOR SCALING THE PREDETERMINED SCR VALUE FOR THE FIRST ORDER SCR-BT LEAKY BUCKET,
P1 AND P2 ARE PRESELECTED VALUES LESS THAN ONE FOR DETERMINING B1, R2, AND B2, RESPECTIVELY, AND P IS A TAG RATE FOR MARKING CELLS WITH CLP=1

1104 — DETERMINING INTERMEDIATE PARAMETERS R AND L IN ACCORDANCE WITH:
R = RHO * SRC, AND
$L = \{B*(1-RHO)\}/LN\{(1-RHO(1-P))/P,\}$
WHERE B = BT * SRC

1106 — DETERMINING PARAMETERS R1 AND B1, AND R2 AND B2, FOR A FIRST LEAKY BUCKET AMD A SECOND LEAKY BUCKET, RESPECTIVELY, OF A SECOND ORDER LEAKY BUCKET IN ACCORDANCE WITH:
R1 = R/RHO1,
$B1 = \{L/(1-RHO1)\}LN\{(1-RHO1(1-P1))/P1\}$,
R2 = (R * P1)/RHO2,
$B2 = \{L/(1-RHO2)\}LN\{(1-RHO2(1-P2))/P2\}$.

SECOND-ORDER LEAKY BUCKET DEVICE AND METHOD FOR TRAFFIC MANAGEMENT IN CELL RELAY NETWORKS

FIELD OF THE INVENTION

This invention relates generally to methods of network traffic management, and more particularly to network traffic management in a cell relay network.

BACKGROUND

It is well known that cell relay networks are subject to congestion when the traffic offered to the network exceeds the capacity of the network. Such congestion conditions need to be controlled in order to guarantee, for each cell relay connection, the Quality of Service (QOS) negotiated between the communicating end systems and the cell relay network during call establishment.

A cell relay communication system, for example, an asynchronous transfer mode (ATM) system, can be viewed as shown in FIG. 1, numeral 100, in which ATM source (102) and destination (110) end systems are coupled with an ATM network including: a source edge node (104), possibly one or more intermediate nodes (106), and a destination edge node (108). ATM cells generated by the source end system (102) are transmitted via the source edge node (104), intermediate nodes (106), and destination node (108) to the destination end system (110).

An important element in proposed ATM congestion control mechanisms is the use of a traffic policing algorithm at the source edge node for each ATM connection. This policing algorithm is often referred to as a Usage Parameter Control (UPC) function. During call establishment, the end systems and network agree on the following traffic parameters for the ATM connection: Peak Cell Rate (PCR) and its associated Cell Delay Variation Tolerance (CDVT), and the; Sustainable Cell Rate (SCR) and its associated Burst Tolerance (BT). The UPC function at the source edge node monitors the cell flow entering the network for conformance to these parameters. A leaky bucket, also referred to as a Generic Cell Rate Algorithm (GCRA), is an important element of the UPC function.

In a typical configuration of the UPC function, shown in FIG. 2, numeral 200, the PCR and CDVT are policed by the PCR leaky bucket (202) with non-conforming (or violating) cells discarded. The SCR and BT are monitored by the SCR leaky bucket (206), with non-conforming or violating cells tagged by setting the Cell Loss Priority (CLP) bit in the ATM header to 1 (208). When significant congestion occurs at a node along the path of the connection, cells with CLP=1 are discarded before cells with CLP=0. In addition, cells may be tagged by the source end system with CLP=1. In the UPC configuration shown in FIG. 2, these tagged cells in combination with the CLP=0 cells are subjected to discard by the PCR leaky bucket, but are not passed through the SCR leaky bucket.

A flow chart describing the operation of the SCR leaky bucket is shown in FIG. 3, numeral 300. That is, upon receiving a cell with CLP=0 (302), the SCR leaky bucket is updated in accordance with Q=MAX{Q-SCR(CLOCK-TIME),0}, where Q is a leaky bucket state and TIME is updated to CLOCK for the system. Upon comparing Q to (BT*SCR) (306), where Q>(BT*SCR), CLP is set equal to 1 (308), and where $Q \leq (BT*SCR)$, Q is set equal to Q+1 (310).

In addition to its use as a policing function in the source edge node, leaky bucket mechanisms similar to that shown in FIG. 2 have been proposed in combination with a cell buffer for use in the source end system or in the source edge node for regulating or shaping the flow of cells entering the network.

The conventional wisdom With the leaky bucket policing mechanism described above is that it serves to protect the network against congestion and in so doing, serves to guarantee the Quality of Service (QOS) (delay, cell loss and throughput) of the ATM connections that are conforming to their agreed traffic parameters. However, a recently published study has shown that, even with SCR leaky bucket enforcement, end systems violating their negotiated SCR and BT traffic parameters can significantly degrade the QOS of other conforming connections with which network resources (e.g., internodal links) are shared.

Thus, there is a need for a device and method for a more efficient leaky bucket that performs the monitoring function for the SCR at the source edge node such that the QOS of established connections conforming to the negotiated traffic parameters is guaranteed even if some end systems are in violation of their negotiated traffic parameters.

BRIEF DESCRIPTION OF THE DRAWINGS

FIG. 7 is a flow diagram of the steps of a first embodiment of a traffic management policing method (TMPM) for monitoring and enforcing sustainable cell rate (SCR) and burst tolerance (BT) in a cell relay network in accordance with the present invention.

FIG. 8 is a flow diagram showing the step of utilizing the SOLBS (706) of FIG. 7 with greater particularity.

FIG. 11 is a flow diagram of the steps of one embodiment of mapping the parameters R1 and R2, and B1 and B2, of the present invention from a predetermined sustainable cell rate (SCR) and burst tolerance (BT) for a preselected first-order SCR-BT leaky bucket.

DETAILED DESCRIPTION OF A PREFERRED EMBODIMENT

Figure 4:
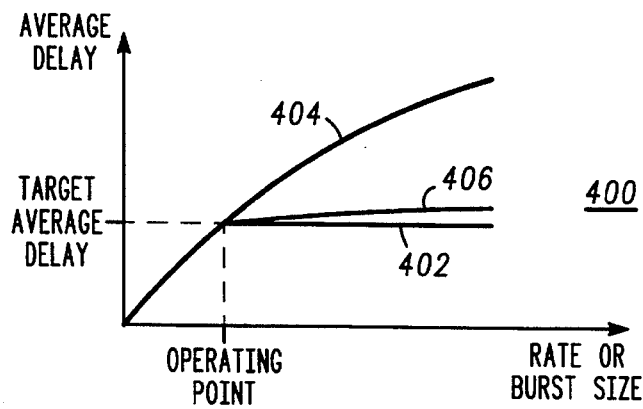
FIG. 4 is a graphical illustration of average delay plotted with respect to rate or burst size for prior art traffic management and for traffic management utilizing the present invention.

FIG. 4, numeral 400, is a graphical illustration of average delay plotted with respect to rate or burst size for prior art traffic management and for traffic management utilizing the present invention. In an ideal system (402), traffic management provides a constant preselected target average delay for all burst sizes and rates greater than or equal to the operating burst size and rate, i.e., the burst size and rate for the target average delay. In a typical prior art system (404), the average delay tends to increase significantly beyond the target average delay with increasing burst size and rate. In a system utilizing the present invention (406), as burst size or rate increases, the average delay is increased only slightly more than for the ideal system (402).

Figure 5:
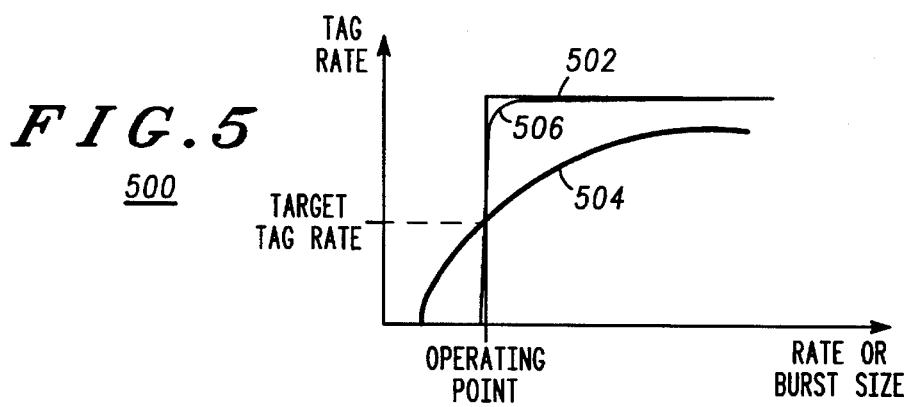
FIG. 5 is a graphical illustration of tag rate plotted with respect to rate or burst size for prior art traffic management and for traffic management utilizing the present invention.

FIG. 5, numeral 500, is a graphical illustration of tag rate plotted with respect to rate or burst size for prior art traffic management and for traffic management utilizing the present invention. In an ideal system (502), traffic management provides a significantly high tag rate for all burst sizes and rates greater than or equal to the operating burst size and rate, i.e., the burst size and rate for the target tag rate. Also, it provides for a significantly low tag rate when the burst size and rate are below the operating point. In a system utilizing the present invention (506), as burst size and rate increase, the tag rate closely approximates the tag rate of the ideal system (502). In contrast, in a typical prior art system (504), the tag rate is not sufficiently high when the operating point is exceeded and is too high when the burst size and rate are below the operating point.

Figure 3:
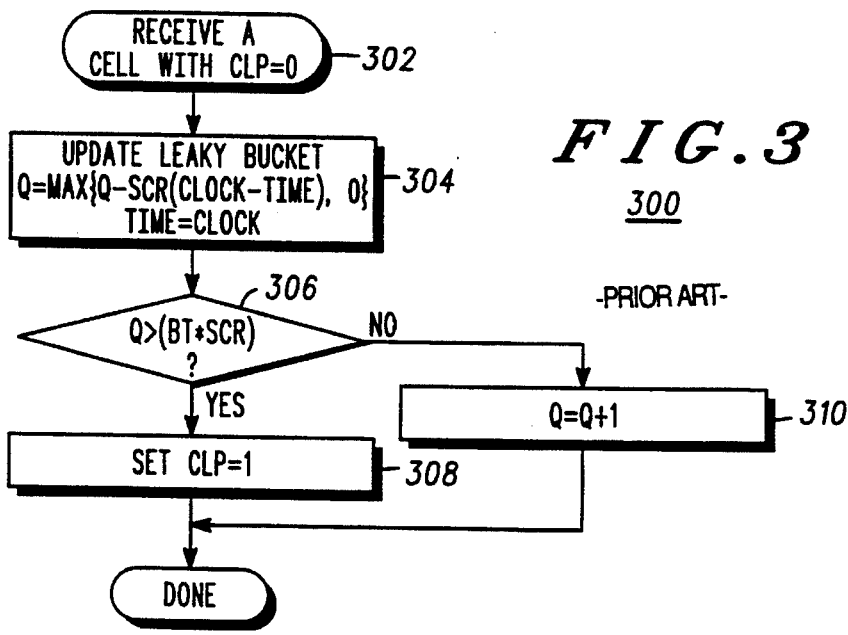
FIG. 3 is a flow chart showing the steps typically implemented by the SCR leaky bucket of FIG. 2.

Thus, the average delay performance and tag rate significantly deviate from the ideal behavior when the prior art (SCR, BT) leaky bucket UPC function described in FIG. 3 is used to police non-conforming ATM connections. As shown in FIG. 4, a problem with the prior art in monitoring the SCR is that when the rate or burst size increases beyond the target operating point due to the non-conforming end systems generating traffic beyond their negotiated traffic contract, the delay QOS cannot be guaranteed, i.e., the average delay goes beyond the target agreed QOS, even for the conforming connections. Ideally, the average delay should not exceed the target average delay, even under conditions of non-conforming connections. The reason that the prior art cannot achieve the expected performance is that the SCR leaky bucket cannot effectively tag cells as shown in FIG. 5.

Figure 6:
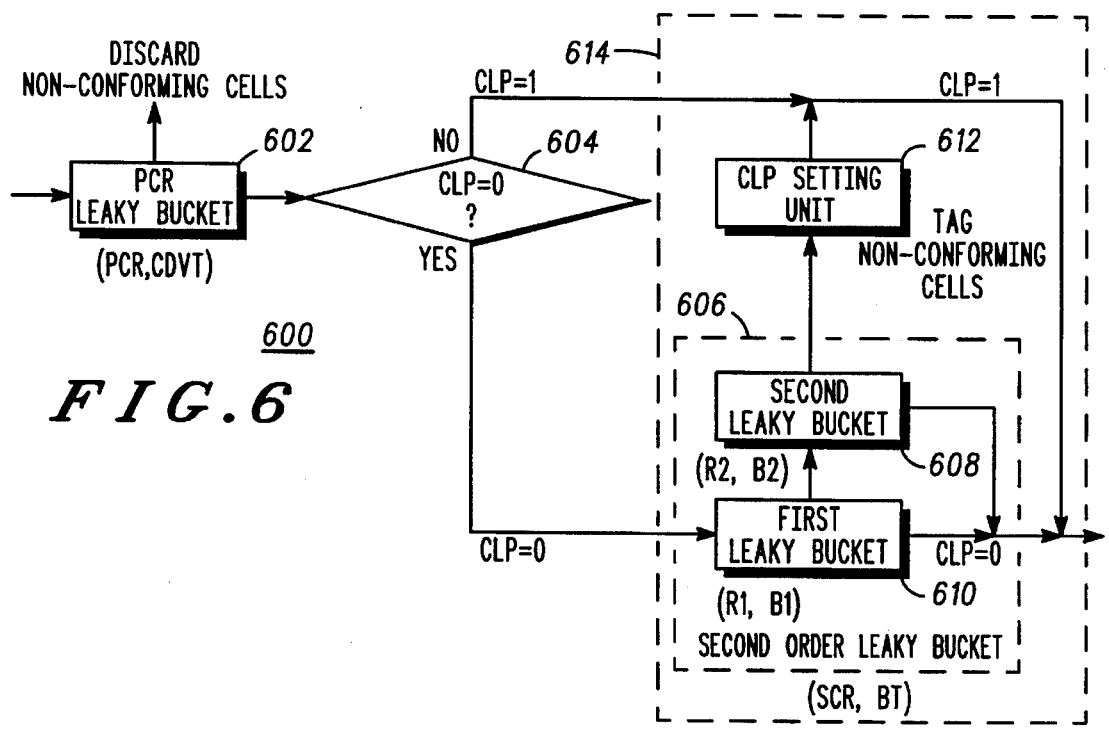
FIG. 6, numeral 600, is a block diagram of an embodiment of a traffic management policing device (TMPD) for monitoring and enforcing sustainable cell rate (SCR) and burst tolerance (BT) in a cell relay network in accordance with the present invention.

FIG. 6, numeral 600, is a block diagram of an embodiment of a traffic management policing device (TMPD) for monitoring and enforcing sustainable cell rate (SCR) and burst tolerance (BT) in a cell relay network in accordance with the present invention. The device includes a peak cell rate (PCR) leaky bucket (602), a cell loss priority (CLP) determining unit (CLP=0?) (604), and a second order leaky bucket system (SOLBS) (614). The peak cell rate (PCR) leaky bucket (602) is operably coupled to receive cells having at least an information field and a header, where the header includes a cell loss priority (CLP) bit and is used for discarding cells in accordance with a predetermined scheme. The cell loss priority (CLP) determining unit (604) is operably coupled to the PCR leaky bucket (602) and is used for determining whether a CLP bit in each cell header is equal to zero. The second order leaky bucket system (SOLBS) (614) is operably coupled to the CLP determining unit (604) and is used for monitoring and enforcing predetermined SCR and BT traffic parameters such that an average delay and tag rate are provided for cells that substantially provide a predetermined quality of service.

The SOLBS (614) typically includes a second-order leaky bucket (606) and a CLP setting unit (612). The second order leaky bucket (606) is operably coupled to the CLP determining unit (604) to receive cells having CLP equal to zero and is used for sorting cells in accordance with predetermined non-conformance criteria. The CLP setting unit (612) is operably coupled to the second order leaky bucket (606) and is used for setting the CLP bit of non-conforming cells to one.

The predetermined non-conformance criteria typically include first predetermined R1 and B1 parameters for a first leaky bucket and second predetermined R2 and B2 parameters for a second leaky bucket, wherein the parameters are determined as set forth below.

In the preferred embodiment the second order leaky bucket includes: (A) the first leaky bucket (610), operably coupled to the CLP determining unit (604), for determining whether received cells conform to the first predetermined R1 and B1 parameters, and (B) the second leaky bucket (608), operably coupled to the first leaky bucket (610), for receiving non-conforming cells from the first leaky bucket (610) and determining whether the non-conforming cells from the first leaky bucket conform to the second predetermined R2 and B2 parameters.

The predetermined scheme for discarding cells is selectable and typically includes discarding cells having at least one of: a peak cell rate and a cell delay variation tolerance that is greater than predetermined PCR and CDVT parameters.

Figure 1:
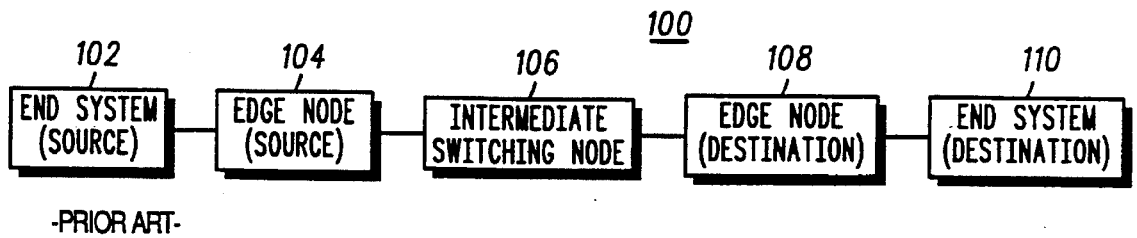
FIG. 1 is a block diagram illustrating typical ATM source and destination end systems coupled with an ATM network.
Figure 2:
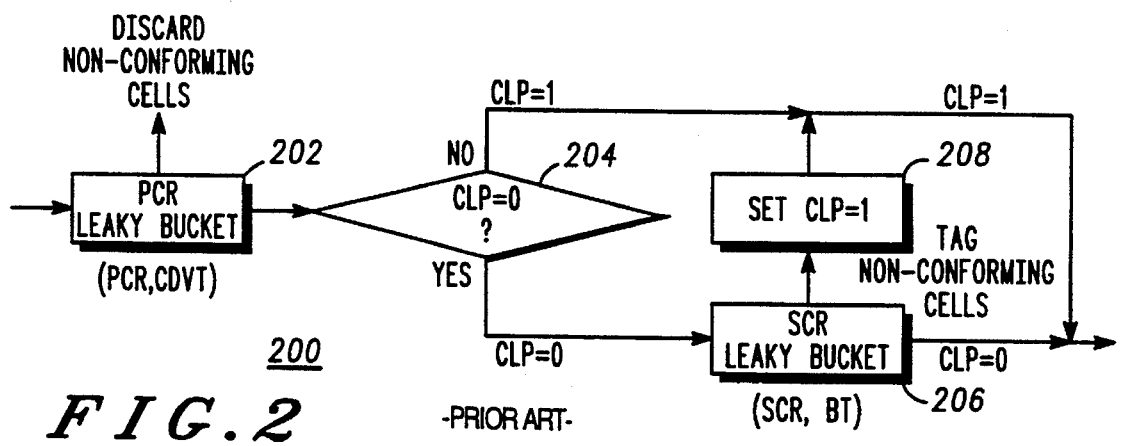
FIG. 2 is a block diagram of a typical system that implements the UPC function wherein the PCR and CDVT are policed by the PCR leaky bucket with non-conforming (or violating) cells discarded.

Thus, a second-order leaky bucket system (606) is utilized to improve performance over the SCR leaky bucket (206) utilized in the prior art (shown in FIG. 2). The (SCR, BT) parameters of a first-order SCR leaky bucket are mapped to (R1, B1) and (R2, B2) parameters for the first and second leaky buckets of the invention, respectively. The parameter mapping of the preferred embodiment is given in FIG. 11, numeral 1100. 15 When a cell with CLP=0 arrives, it enters the first leaky bucket. If the cell is determined to be non-conforming to the (R1, B1) parameters of the first-leaky bucket, it is sent to the second leaky bucket, otherwise it is allowed to exit the UPC function with CLP=0. Cells found to be non-conforming by the first leaky bucket and sent to the second leaky bucket will be CLP=1 tagged if also found to be non-conforming to the (R2, B2) parameters of the second leaky bucket. Those cells found to be conforming to the second leaky bucket are allowed to exit the UPC function with CLP=0. In summary, a CLP=0 cell must be found to be non-conforming by both the first and second leaky buckets for it to be tagged with CLP=1.

FIG. 7, numeral 700, is a flow diagram of the steps of a first embodiment of a traffic management policing method (TMPM) for monitoring and enforcing sustainable cell rate (SCR) and burst tolerance (BT) in a cell relay network in accordance with the present invention. The method (700) includes the steps of: (A) utilizing a peak cell rate (PCR) leaky bucket that receives cells having at least an information field and a header, where the header includes a cell loss priority (CLP) bit, for discarding cells in accordance with a predetermined scheme (702), (B) utilizing a cell loss priority (CLP) determining unit that is operably coupled to the PCR leaky bucket for determining whether a CLP bit in each cell header is equal to zero (704), and (C) utilizing a second order leaky bucket system (SOLBS) that is operably coupled to the CLP determining unit for monitoring and enforcing predetermined SCR and BT traffic parameters such that an average delay and tag rate are provided for cells that substantially provide a predetermined quality of service (706).

As set forth in FIG. 8, numeral 800, utilizing the SOLBS (706) typically includes the steps of: (A) utilizing a second order leaky bucket that is operably coupled to the CLP determining unit to receive cells having CLP equal to zero for sorting cells in accordance with predetermined non-conformance criteria (802) and (B) using a CLP setting unit that is operably coupled to the second order leaky bucket for setting the CLP bit of non-conforming cells to one (804).

Typically, the predetermined non-conformance criteria include: (A) first predetermined R1 and B1 parameters for a first leaky bucket, and (B) second predetermined R2 and B2 parameters for a second leaky bucket. The R1, R2, B1, and B2 parameters are typically determined as described below.

Figure 9:
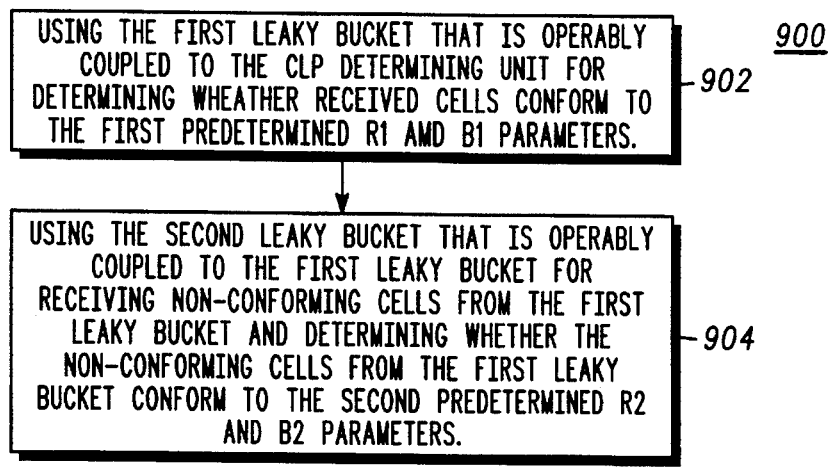
FIG. 9 is a flow diagram showing the step of utilizing the second order leaky bucket (802) of FIG. 8 with greater particularity.

As set forth in FIG. 9, numeral 900, utilizing the second order leaky bucket (802) typically includes the steps of: (A) using the first leaky bucket that is operably coupled to the CLP determining unit for determining whether received cells conform to the first predetermined R1 and B1 parameters (902) and (B) using the second leaky bucket that is operably coupled to the first leaky bucket for receiving non-conforming cells from the first leaky bucket and determining whether the non-conforming cells from the first leaky bucket conform to the second predetermined R2 and B2 parameters (904).

Again, the predetermined scheme for discarding cells is selectable and typically includes discarding cells having at least one of: a peak cell rate, and a cell delay variation tolerance greater than predetermined PCR and CDVT parameters.

Thus, in the prior art, a first order leaky bucket is used to monitor and enforce the SCR and BT traffic parameters wherein average delay and loss rate QOS for conforming connections can be seriously deteriorated when non-conforming connections exceed their contracted traffic parameters, i.e., beyond the operating point in rate or burst size. Utilizing the second-order leaky bucket of the present invention, the QOS can be more effectively guaranteed even if other connections exceed their contracted traffic parameters. Thus, the present invention improves the performance of the prior art significantly and is broadly applicable to asynchronous transfer mode (ATM) networks.

Hence, the second-order leaky bucket includes two leaky buckets used for traffic policing, typically in the source edge node or traffic shaping in the source end system and/or source edge node. The non-conforming cells from the first leaky bucket are the input to the second leaky bucket. A cell must be found to be non-conforming by both the first and second leaky buckets for it to be tagged with CLP=1. Traffic parameters SCR and BT, typically the parameters for a first order SCR leaky bucket are mapped into the parameters of the second-order leaky bucket (R1, B1, R2 and B2).

Figure 10:
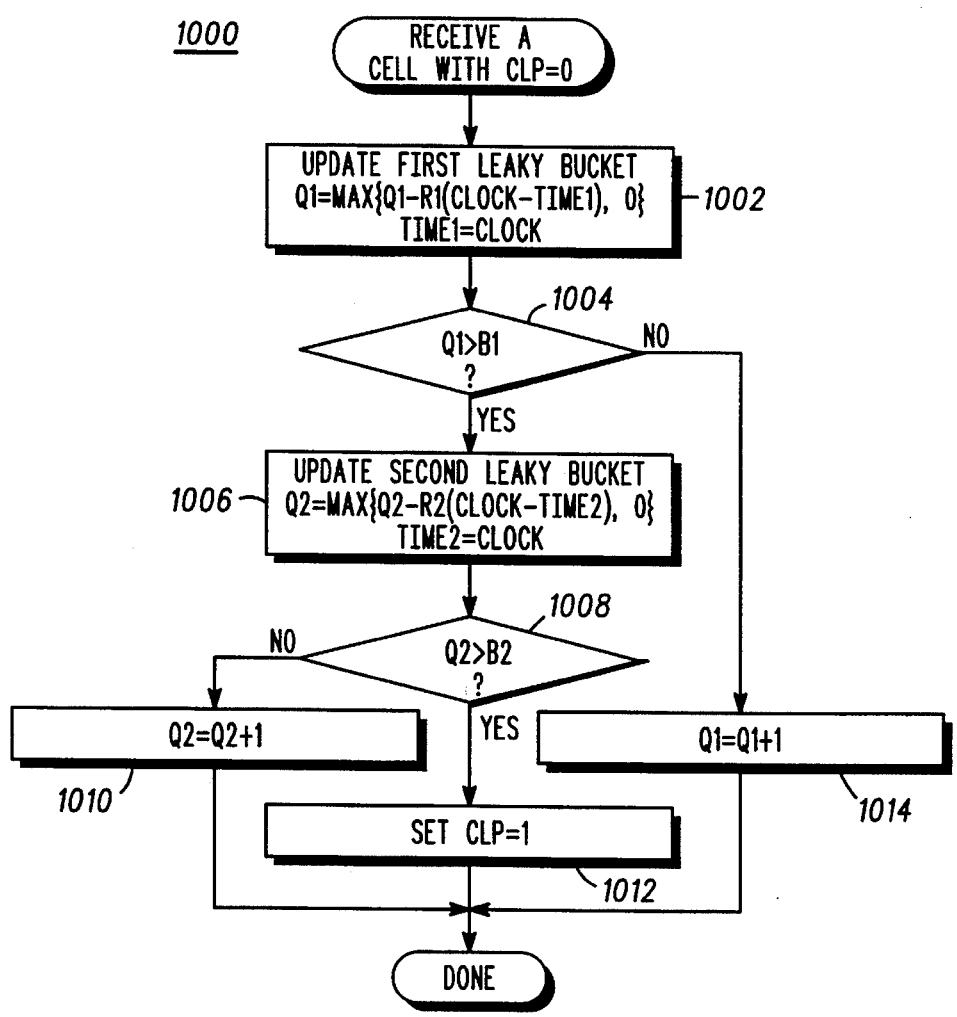
FIG. 10 is a flow diagram of the steps of a second embodiment of a traffic management policing method (TMPM) for monitoring and enforcing sustainable cell rate (SCR) and burst tolerance (BT) in a cell relay network in accordance with the present invention.

In a second embodiment, the steps of which are set forth in FIG. 10, numeral 1000, the method of the present invention, which provides for managing and policing traffic in a cell relay network to provide monitoring and enforcement of sustainable cell rate (SCR) and burst tolerance (BT) may be selected to include the steps of: (A) upon receiving a cell with a cell loss priority (CLP) bit equal to zero, updating a parameter $Q1$ (1002) of a first leaky bucket of a second-order leaky bucket in accordance with:

$$Q1 = MAX\{Q1 - R1(CLOCK - TIME1), 0\},$$

where $Q1$ is the state of the first leaky bucket, $R1$ is a predetermined leaky bucket cell rate for the first leaky bucket, CLOCK is the current time, and TIME1 is set to CLOCK when $Q1$ is updated, (B) determining whether $Q1$ is greater than a predetermined bucket size $B1$ (1004), (C) where $Q1$ is less than or equal to a predetermined bucket size $B1$ of the first leaky bucket, setting $Q1 = Q1 + 1$ (1014), (D) where $Q1$ is greater than $B1$, (D1) updating a parameter $Q2$ (1006) of a second leaky bucket of the second-order leaky bucket in accordance with:

$$Q2 = MAX\{Q2 - R2(CLOCK - TIME2), 0\},$$

where $Q2$ is the state of the second leaky bucket, $R2$ is a predetermined leaky bucket rate for the second leaky bucket, CLOCK is the current time, and TIME2 is set to CLOCK when $Q2$ is updated, (D2) determining whether $Q2$ is greater than a predetermined bucket size $B2$ (1008) of the second leaky bucket, (D2a) where $Q2$ is less than or equal to $B2$, setting $Q2 = Q2 + 1$ (1010), and (D2b) where $Q2$ is greater than $B2$, setting the CLP bit of the cell equal to one (1012).

As set forth in FIG. 11, numeral 1100, typically, R1 and R2, and B1 and B2, are mapped from a predetermined sustainable cell rate (SCR) and burst tolerance (BT) for a preselected first-order SCR-BT leaky bucket, and are determined by: (A) presetting (1102) initial parameters rho, rho1, rho2, P1, P2 and P, where rho1<1, rho2<1, P1<1, P2<1 and P1·P2=P, rho is a preselected value less than one for scaling the predetermined SCR value for the first-order SCR-BT leaky bucket, P1 and P2 are preselected values less than one for determining B1, R2 and B2, respectively, and P is the target tag rate for marking cells with CLP=1, (B) determining intermediate parameters r and L (1104) in accordance with:

$$r = rho * SCR,$$

and $$L = \{B*(1-rho)\}/\ln\{(1-rho(1-P))/P\},$$

where $B = BT * SCR$, (C) determining parameters R1 and B1, and R2 and B2, for a first leaky bucket and a second leaky bucket, respectively, of a second-order leaky bucket (1106) in accordance with:

$$R1 = r/rho1,$$

$$B1 = \{L/(1-rho1)\} \ln\{(1-rho1(1-P1))/P1\},$$

$$R2 = (r*P1)/rho2,$$

$$B2 = \{L/(1-rho2)\} \ln\{(1-rho2(1-P2))/P2\}.$$

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A traffic management policing device, TMPD, for monitoring and enforcing sustainable cell rate, SCR, and burst tolerance, BT, in a cell relay network, comprising:

(A) a peak cell rate, PCR, leaky bucket, operably coupled to receive cells having at least an information field and a header, where the header includes a cell loss priority, CLP, bit, for discarding cells in accordance with a predetermined scheme, (B) a cell loss priority, CLP, determining unit, operably coupled to the PCR leaky bucket, for determining whether a CLP bit in each cell header is equal to zero, and (C) a second order leaky bucket system, SOLBS, operably coupled to the CLP determining unit, for monitoring and enforcing predetermined SCR and BT traffic parameters such that an average delay and tag rate are provided for cells substantially to provide a predetermined quality of service, wherein the SOLBS comprises:

(D) a second order leaky bucket, operably coupled to the CLP determining unit to receive cells having CLP equal to zero, for sorting cells in accordance with predetermined non-conformance criteria, and (E) a CLP setting unit, operably coupled to the second order leaky bucket, for setting the CLP bit of non-conforming cells to one, and wherein the predetermined non-conformance criteria include:

(F) first predetermined R1 and B1 parameters for a first leaky bucket, and (G) second predetermined R2 and B2 parameters for a second leaky bucket.

2. The TMPD of claim 1 wherein the second order leaky bucket comprises:

(A) the first leaky bucket, operably coupled to the CLP determining unit, for determining whether received cells conform to the first predetermined R1 and B1 parameters, and (B) the second leaky bucket, operably coupled to the first leaky bucket, for receiving non-conforming cells from the first leaky bucket and determining whether the non-conforming cells from the first leaky bucket conform to the second predetermined R2 and B2 parameters.

3. The TMPD of claim 1 wherein the predetermined scheme for discarding cells includes discarding cells having at least one of:

(A) a PCR value greater than predetermined PCR parameter, and (B) CDVT value greater than predetermined CDVT parameter.

4. A traffic management policing method, TMPM, for monitoring and enforcing sustainable cell rate, SCR, and burst tolerance, BT, in a cell relay network, comprising the steps of:

(A) utilizing a peak cell rate, PCR, leaky bucket that receives cells having at least an information field and a header, where the header includes a cell loss priority, CLP, bit, for discarding cells in accordance with a predetermined scheme, (B) utilizing a cell loss priority, CLP, determining unit that is operably coupled to the PCR leaky bucket for determining whether a CLP bit in each cell header is equal to zero, and (C) utilizing a second order leaky bucket system, SOLBS, that is operably coupled to the CLP determining unit for monitoring and enforcing predetermined SCR and BT traffic parameters such that an average delay and tag rate are provided for cells substantially to provide a predetermined quality of service, wherein utilizing the SOLBS comprises the steps of:

(D) utilizing a second order leaky bucket that is operably coupled to the CLP determining unit to receive cells having CLP equal to zero for sorting cells in accordance with predetermined non-conformance criteria, and (E) using a CLP setting unit that is operably coupled to the second order leaky bucket for setting the CLP bit of non-conforming cells to one, and wherein the predetermined non-conformance criteria include:

(F) first predetermined R1 anti B1 parameters for a first leaky bucket, and (G) second predetermined R2 and B2 parameters for a second leaky bucket.

5. The TMPM of claim 4 wherein utilizing the second order leaky bucket comprises the steps of:

(A) using the first leaky bucket that is operably coupled to the CLP determining unit for determining whether received cells conform to the first predetermined R1 and B1 parameters, and (B) using the second leaky bucket that is operably coupled to the first leaky bucket for receiving non-conforming cells from the first leaky bucket and determining whether the non-conforming cells from the first leaky bucket conform to the second predetermined R2 and B2 parameters.

6. The TMPM of claim 4 wherein the predetermined scheme for discarding cells includes discarding cells having at least one of:

(A) a PCR value greater than predetermined PCR parameter, and (B) CDVT value greater than predetermined CDVT parameter.

7. A method for managing and policing traffic in a cell relay network to provide monitoring and enforcement of sustainable cell rate, SCR, and burst tolerance, BT, comprising the steps of:

(A) upon receiving a cell with a cell loss priority, CLP, bit equal to zero, updating a parameter Q1 of a first leaky bucket of a second-order leaky bucket in accordance with:

$$Q1 = \mathrm{MAX}\{Q1 - R1(\mathrm{CLOCK} - \mathrm{TIME1}), 0\},$$

where $Q1$ is the state of the first leaky bucket, $R1$ is a predetermined leaky bucket cell rate for the first leaky bucket, CLOCK is the current time, and TIME1 is set to CLOCK when $Q1$ is updated, (B) determining whether $Q1$ is greater than a predetermined bucket size $B1$, (C) where $Q1$ is less than or equal to a predetermined bucket size $B1$ of the first leaky bucket, setting $Q1 = Q1 + 1$, (D) where Q1 is greater than B1,
  (D1) updating a parameter Q2 of a second leaky bucket of the second-order leaky bucket in accordance with:

$$Q2 = \text{MAX}\{Q2 - R2(\text{CLOCK} - \text{TIME2}), 0\},$$

where
  Q2 is the state of the second leaky bucket,
  R2 is a predetermined leaky bucket rate for the second leaky bucket,
  CLOCK is the current time, and
  TIME2 is set to CLOCK when Q2 is updated,
    D2) determining whether Q2 is greater than a predetermined bucket size B2 of the second leaky bucket,
      (D2a) where Q2 is less than or equal to B2, setting Q2=Q2+1, and
      (D2b) where Q2 is greater than B2, setting the CLP bit of the cell equal to one.

8. The method of claim 7 wherein R1, R2, B1, and B2 are mapped from a predetermined sustainable cell rate, SCR, and burst tolerance BT, for a first-order SCR-BT leaky bucket, and are determined by the steps of:

(A) presetting initial parameters rho, rho1, rho2, P1, P2 and P,
where
  rho1<1, rho2<1, P1<1, P2<1 and P1·P2=P,
  rho is a preselected value less than one for scaling the predetermined SCR value for the first-order SCR-BT leaky bucket,
  P1 and P2 are preselected values less than one for determining B1, R2 and B2, respectively, and
  P is a target tag rate for marking cells with CLP=1, (B) determining intermediate parameters r and L in accordance with:

$$r = rho * SCR,$$

and $$L = \{B*(1-rho)\}/\ln\{(1-rho(1-P))/P\},$$

where
  B=BT*SCR, (C) determining parameters R1 and B1, and R2 and B2, for a first leaky bucket and a second leaky bucket, respectively, of a second-order leaky bucket in accordance with:

$$R1 = r/rho1,$$

$$B1 = \{L/(1-rho1)\}\ln\{(1-rho1(1-P1))/P1\},$$

$$R2 = (r*P1)/rho2,$$

$$B2 = \{L/(1-rho2)\}\ln\{(1-rho2(1-P2))/P2\}.$$

* * * * *